Jan. 3, 1950  H. Z. MARTIN  2,493,494
HEAT RECOVERY IN A FLUIDIZED CATALYST REGENERATION
Filed April 11, 1945
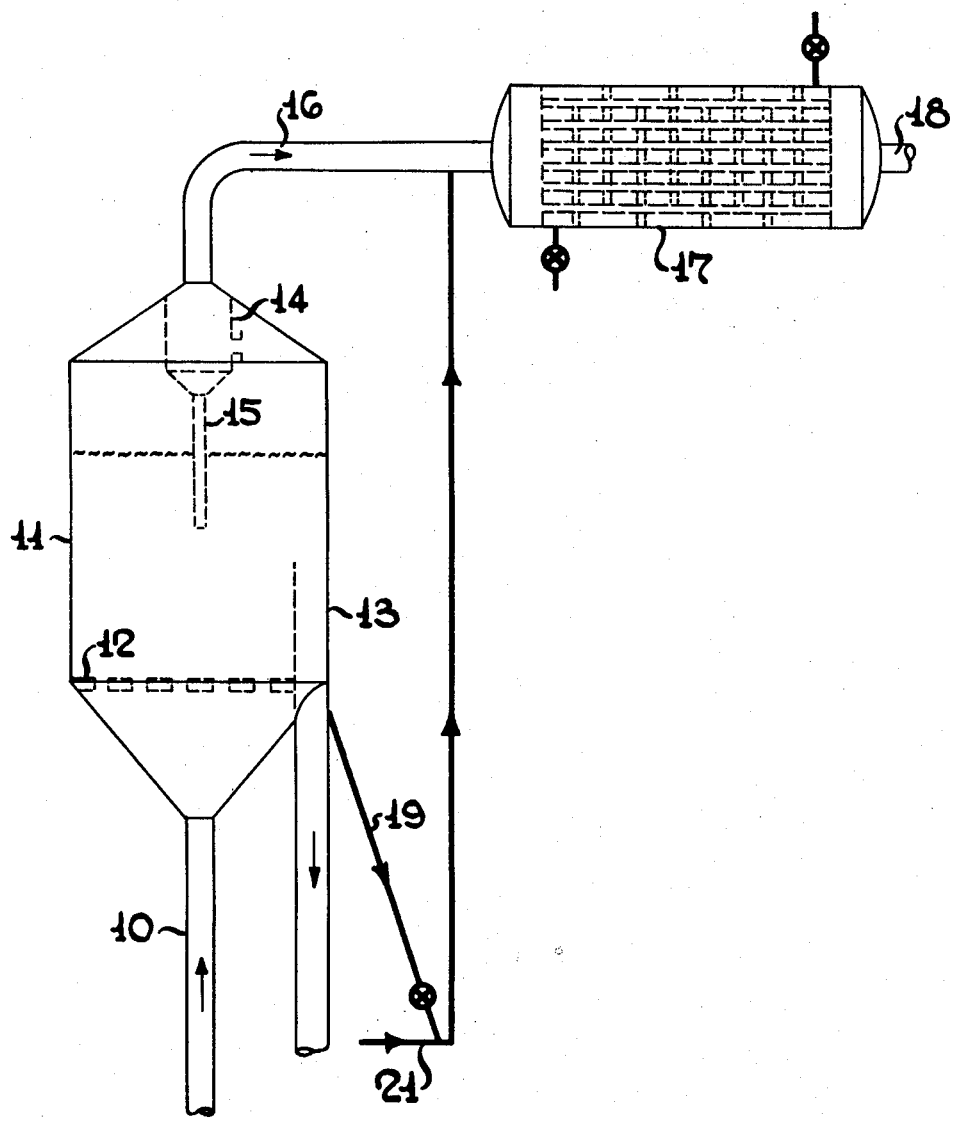
Homer Z. Martin Inventor
By _____ Attorney Patented Jan. 3, 1950

2,493,494

UNITED STATES PATENT OFFICE 2,493,494

HEAT RECOVERY IN A FLUIDIZED CATALYST REGENERATION

Homer Z. Martin, Roselle, N. J., assignor to Standard Oil Development Company, a corporation of Delaware Application April 11, 1945, Serial No. 587,649

2 Claims. (Cl. 252—417)

This invention relates to the recovery of heat from hot, dust-laden gases and pertains more particularly to a method of improving the efficiency of heat transfer equipment.

In several industrial processes, such as in cement manufacture, metallurgical operations and catalyst regeneration, it is neccesary to remove heat from relatively high temperature, dust-laden gases. This is usually accomplished by passing the hot, dust-laden gases through a heat exchanger in which the gases pass in indirect heat exchange relation with a cooling fluid.

It has been found that in such operations the heat transfer coefficient between the gas stream and the wall of the heat exchanger is very poor due to the tendency of the dust to accumulate on the walls, forming a layer through which the heat must be conducted in order to get to the cooling fluid. This layer of dust is often very persistent, remaining on the tubes of the exchanger, for example, even though the gas is being blown through the tubes at velocities of the order of 100 feet per second or higher.

It has been found that these finely divided solids can be removed from the tubes and the heat exchangers operated at a higher efficiency by injecting a small amount of coarser solids into the stream of gases passing through the heat exchanger. These coarser solids may be continuously introduced into the gas stream. In other cases the coarser particles may be injected intermittently to remove the films developed on the heat exchanger walls.

The invention has found particular application in the removal of heat from spent regeneration gas employed for regenerating finely divided catalyst in catalytic cracking and the invention will be described in detail with specific reference to this process, it being understood that it has a broader application, as previously stated.

For a better understanding of the invention, reference will now be made to the accompanying drawing which is a partly diagrammatic and partly schematic illustration of an apparatus capable of carrying the invention into effect.

Referring to the drawing, the reference character 10 designates a line through which a stream of regeneration gas containing finely divided catalyst to be regenerated is introduced into a regenerator 11 through a perforated grid 12. After passing through the grid 12, the velocity of the regenerating gas is reduced to permit the catalyst to separate into a relatively dense, turbulent layer in the bottom portion of the regenerator, as illustrated. A stream of regenerated catalyst is withdrawn from the bottom portion of the regenerator 11 through a conduit or standpipe 13 and is discharged into a stream of oil to be cracked in any suitable manner (not shown). The regeneration gas rising through the regenerator burns combustible deposits from the catalyst, and the spent regeneration gas containing entrained finely divided catalyst is withdrawn from the top of the regenerator 11 through a cyclone separator 14 which removes entrained catalyst powder from the gas. The catalyst so removed is returned to the regenerator through conduit 15.

The regenerator is normally maintained at a temperature of from 1000° F. to 1100° F. by burning the combustible deposits from the catalyst during regeneration. The hot, spent combustion gases resulting from regeneration are withdrawn from the cyclone separator 14 through line 16. This gas stream then passes to an indirect heat exchanger 17 containing a bank of tubes through which the gas stream passes in indirect heat exchange with a cooling fluid such as oil or water which circulates around the tubes. The gas after passing through the heat exchanger 17 is withdrawn through line 18 and may be passed to a Cottrell precipitator or to additional equipment for further purification. The gases passing through the heat exchanger 17 will normally contain a small amount of finely divided solids which tend to accumulate on the walls of the cooling tubes and thus impair the efficiency of the heat exchanger.

In accordance with the present invention, a relatively small stream of a coarser catalyst is withdrawn from the bottom of the regenerator 11 through line 19 which discharges into a stream of carrier gas passing through line 21 and is transferred into the gas line 16 leading to the heat exchanger. The relatively coarser material discharging into the gas stream passing through line 16 tends to remove or prevent the accumulation of a film of finely divided solids on the walls of the heat exchanger and thus materially improves the heat transfer efficiency of the heat exchanger. The stream of coarser material passing through line 21 may be injected into the stream in a continuous manner or at intervals as required in order to keep the tubes clean.

The invention finds particular application where the dust contained in the gases is in extremely finely divided state having an average particle size, for example, between 0 and 20 microns. In such cases the coarser particles introduced into the gas stream should have an average particle size of at least 40 to 60 microns and preferably greater. The amount of coarse particles introduced into the gas stream may vary over an extended range. Good results are obtained by introducing an amount of coarse particles substantially equal to the amount of fine particles contained in the gas stream. Advantages may be obtained, however, when employing smaller amounts of coarser particles.

Having described the preferred embodiment of the invention, it will be understood that it embraces such other variations and modifications as come within the spirit and scope thereof.

What is desired to be protected by Letters Patent is:

1. In the regeneration of finely divided catalyst wherein a stream of oxidizing gas is passed upwardly through a regenerating zone containing a body of finely divided catalyst of varying particle size at a velocity adjusted to maintain a relatively dense layer of catalyst in the bottom portion of said regenerator and a stream of hot, spent regeneration gas containing a small amount of entrained catalyst powder is removed from the upper portion of said regenerator and passed through a heat exchanger to recover heat therefrom; the improvement which comprises withdrawing a small stream of relatively coarser catalyst from the bottom portion of said regenerator and injecting said stream of coarser catalyst into the gas stream containing said entrained catalyst prior to passing to said heat exchanger in an amount sufficient to prevent accumulation of the fine entrained powder on the surface of said heat exchanger.

2. The process as defined in cliam 1 wherein the finely divided catalyst particles entrained in the spent oxidizing gas have an average particle size between 0 and 20 microns and the coarser catalyst has an average particle size of at least 40 to 60 microns.

HOMER Z. MARTIN.

REFERENCES CITED

The following references are of record in the file of this patent:

UNITED STATES PATENTS

| Number | Name | Date |
|---|---|---|
| 1,058,298 | Gregg | Apr. 8, 1913 |
| 1,867,101 | Roosen | July 12, 1932 |
| 2,036,578 | Keyes | Apr. 7, 1936 |
| 2,299,307 | Cornell | Oct. 20, 1942 |
| 2,379,448 | Linn | July 3, 1945 |
| 2,391,334 | Nicholson | Dec. 18, 1945 |
| 2,396,709 | Leffer | Mar. 19, 1946 |
| 2,419,098 | Stratford et al. | Apr. 15, 1947 |
| 2,420,542 | Jahnig | May 13, 1947 |

FOREIGN PATENTS

| Number | Country | Date |
|---|---|---|
| 443,948 | Great Britain | Mar. 10, 1936 |

OTHER REFERENCES

Gaudin, "Principles of Mineral Dressing," McGraw-Hill Book Company, page 54 (1939).